United States Patent
Kendall

(10) Patent No.: US 9,807,944 B2
(45) Date of Patent: Nov. 7, 2017

(54) CONVERTIBLE WREATH

(76) Inventor: Patricia M. Kendall, Fairborn, OH (US)

( * ) Notice: Subject to any disclaimer, the term of this patent is extended or adjusted under 35 U.S.C. 154(b) by 879 days.

(21) Appl. No.: 13/214,518

(22) Filed: Aug. 22, 2011

(65) Prior Publication Data

US 2012/0052218 A1 Mar. 1, 2012

Related U.S. Application Data

(60) Provisional application No. 61/376,490, filed on Aug. 24, 2010.

(51) Int. Cl.
A01G 5/04 (2006.01)

(52) U.S. Cl.
CPC ........... *A01G 5/04* (2013.01); *Y10T 29/49826* (2015.01)

(58) Field of Classification Search
USPC ................................................ 428/7, 10, 100
See application file for complete search history.

(56) References Cited

U.S. PATENT DOCUMENTS

| | | | | |
|---|---|---|---|---|
| 315,795 A * | 4/1885 | Kaufmann | | 428/10 |
| 399,270 A * | 3/1889 | Kumpf | | 428/10 |
| 1,093,243 A * | 4/1914 | Beistle | | 428/10 |
| 1,158,076 A * | 10/1915 | Rossig et al. | | 428/10 |
| 1,320,693 A * | 11/1919 | Kaplan | | 428/10 |
| 1,478,487 A * | 12/1923 | Ross | | 428/10 |
| 1,609,056 A * | 11/1926 | Bouchard | | 428/10 |
| 1,611,589 A * | 12/1926 | Janusek | | 428/27 |
| 1,657,750 A * | 1/1928 | Hanson et al. | | 428/10 |
| 1,696,221 A * | 12/1928 | Tubbs | | 428/27 |
| 1,817,173 A * | 8/1931 | Brandt | | 428/10 |
| 2,079,250 A * | 5/1937 | Grisolia | | 428/10 |
| 2,227,187 A * | 12/1940 | Hanson | | 428/10 |
| 2,727,326 A * | 12/1955 | MacGregor | | 428/10 |
| 3,046,685 A * | 7/1962 | Blum | | 428/11 |
| 3,110,647 A * | 11/1963 | Tong | | 428/27 |
| 3,141,808 A * | 7/1964 | Wellens | | A01G 5/04 206/1.7 |
| 3,591,442 A * | 7/1971 | Matesi | | 28/10 |
| 4,100,316 A | 7/1978 | Lackey | | |
| 4,144,365 A * | 3/1979 | Scudder et al. | | 428/10 |
| 5,110,635 A | 5/1992 | Creegan | | |
| 5,501,889 A | 3/1996 | Church | | |

(Continued)

FOREIGN PATENT DOCUMENTS

DK WO 9524588 A1 * 9/1995 ............ F21V 21/096

*Primary Examiner* — D Lawrence Tarazano
*Assistant Examiner* — Stephanie Cox
(74) *Attorney, Agent, or Firm* — Ward Law Office LLC; Jacob M. Ward

(57) ABSTRACT

A wreath and a method of producing a wreath; the wreath comprising a base, at least one permanent decoration coupled to the base to cover at least a portion of the base, and at least one removable decoration releasably coupled to a predetermined, unobstructed area of the base. The base and the removable decorations include a coupling mechanism for releasably coupling the removable decorations to the base. The removable decorations further include labels that correspond to labels located on the base. The labels located on the base identify a suggested location for the removable decorations on the wreath, such that the wreath can be constructed independent of a user's artistic ability.

10 Claims, 5 Drawing Sheets

(56) References Cited

U.S. PATENT DOCUMENTS

| | | | |
|---|---|---|---|
| 5,513,978 A | 5/1996 | Eimerman, Jr. et al. | |
| 5,789,043 A * | 8/1998 | Law et al. | 428/10 |
| 6,667,079 B1 * | 12/2003 | Glenn | 428/10 |
| 6,709,266 B2 * | 3/2004 | Jensen | F21V 21/0824 30/453 |
| 7,217,446 B2 * | 5/2007 | Moody | 428/10 |
| 2006/0117629 A1 * | 6/2006 | Errington | 40/658 |
| 2006/0210728 A1 * | 9/2006 | Moody | 428/10 |
| 2009/0317568 A1 * | 12/2009 | Hruska | 428/10 |
| 2010/0304050 A1 * | 12/2010 | Kwok | 428/10 |

* cited by examiner

US 9,807,944 B2

CONVERTIBLE WREATH

CROSS REFERENCE TO RELATED APPLICATIONS

This application claims priority to U.S. Provisional Patent Application Ser. No. 61/376,490, filed Aug. 24, 2010, the entire disclosure of which is incorporated herein by reference.

BACKGROUND OF THE INVENTION

The present invention relates generally to a wreath. In particular, the invention is directed to a convertible wreath having at least one permanent decoration and at least one selectively removable decoration, and a method of arranging the decorations on the wreath.

BACKGROUND OF THE INVENTION

Wreaths are commonly used for decorative purposes. Typically, a wreath is used for only one occasion such as Christmas, for example. The wreath may be used annually, or it may be used once and then discarded, for example, with a live evergreen wreath. One reason the wreath may have limited use is that typically, decorative elements and accessories are attached permanently or semi-permanently, e.g., decorative elements attached to wires that wrap around the wreath, or accessories that are glued in place. It is difficult and time consuming to change these accessories. In addition, the wreath may deteriorate aesthetically each time the accessories are changed. To date, wreaths have not been designed to withstand frequent accessory removal and replacement.

It is known in the art to make wreaths having removable decorations. U.S. Pat. No. 3,591,442 to A. J. Matesi discloses a wreath formed with apertures in the base unit as a means for decorations to be pushed through with a plastic binding having a knobby end. The knobby ends tend to bend or break when used repeatedly and complicate the attachment process. In U.S. Pat. No. 4,100,316 to Lackey, a decorative wreath including a base covered with greenery and a plurality of decorative objects (e.g. pine cones and fruit) coupled to the base is disclosed. The decorative objects are coupled to the base using an elastic band spirally wrapped around the entire circumference of the base, making removal and replacement difficult. In U.S. Pat. No. 5,110,635 to Creegan, a reusable wreath having a wreath base and a fastener strip wound around a cross-section of the base is disclosed. Various decorative elements and accessories are coupled to the fastener strip to change the appearance of the wreath. The decorative elements can be secured to the fastener strip in any position relative to the base, but users must use their own artistic abilities to arrange the wreath. The entire disclosures of each of the abovementioned patents are hereby incorporated by reference.

The wreaths disclosed in the prior art require a user to decorate and redecorate the wreath without any guidance. Accordingly, when decorating the wreath, the user must rely on a personal artistic ability. In order to decorate a conventional wreath for a particular occasion, the user is required to select and coordinate the appropriate decorative elements. Furthermore, the user must use their personal artistic ability to arrange and attach the decorations on the wreath to produce an aesthetically pleasing decorative wreath.

It would be desirable to develop a convertible wreath having at least one permanent decoration and at least one removable decoration releasably coupled to a limited, pre-defined area of the wreath, and a method of producing the wreath, wherein the convertible wreath and the method maximize an aesthetic and artistic appeal independent of an artistic ability of a user.

SUMMARY OF THE INVENTION

Consonant with the present invention, a convertible wreath having at least one permanent decoration and at least one removable decoration releasably coupled to a limited, pre-defined area of the wreath, and a method of producing the wreath, wherein the convertible wreath and the method maximize an aesthetic and artistic appeal independent of an artistic ability of a user, has surprisingly been discovered.

In one embodiment, a convertible wreath comprises: a base; at least one permanent decoration coupled to the base to cover at least a portion of the base; and at least one removable decoration releasably coupled to a predetermined, unobstructed area of the base.

In another embodiment, a decoration kit for a convertible wreath comprises: a base; at least one permanent decoration coupled to the base to cover at least a portion of the base; and a plurality of removable decorations for releasably coupling to an unobstructed area of the base, each of the removable decorations having a label associated therewith, wherein the label identifies a location on the base where the associated one of the removable decorations is to be disposed.

The invention also provides methods for producing a wreath. One method comprises the steps of: providing a base; coupling a permanent decoration to the base, wherein the permanent decoration covers at least a portion of the base; providing a plurality of removable decorations, wherein each of the removable decorations includes a label associated therewith; and releasably coupling each of the removable decorations to an uncovered portion of the base, wherein a location of each of the removable decorations is dependent upon the label associated therewith.

BRIEF DESCRIPTION OF THE DRAWINGS

The above, as well as other advantages of the present disclosure, will become readily apparent to those skilled in the art from the following detailed description of the preferred embodiment when considered in the light of the accompanying drawings, in which.

DETAILED DESCRIPTION OF EXEMPLARY EMBODIMENTS OF THE INVENTION

Figure 1:
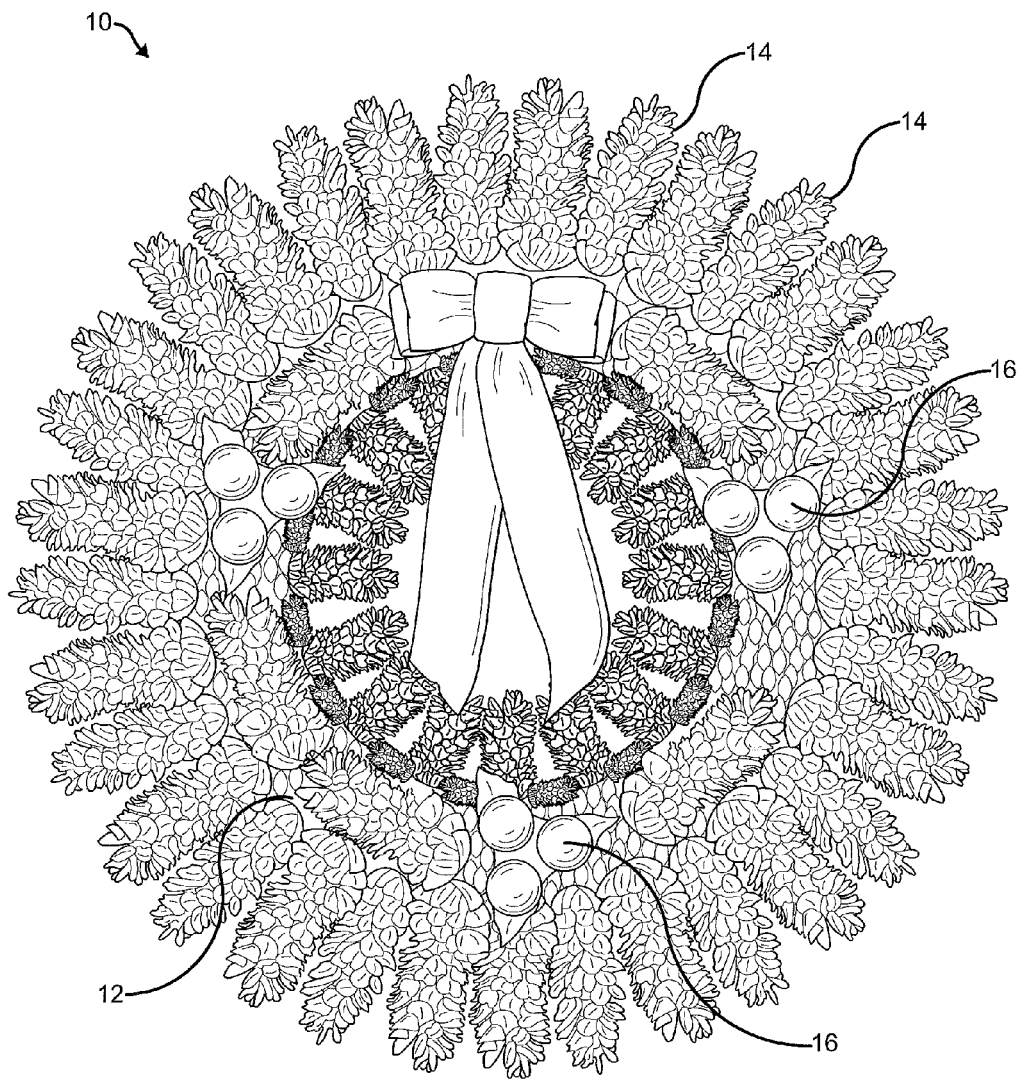
FIG. 1 is a front elevational view of a convertible wreath according to an embodiment of the present disclosure.

The following detailed description and appended drawings describe and illustrate various embodiments of the invention. The description and drawings serve to enable one skilled in the art to make and use the invention, and are not intended to limit the scope of the invention in any manner.

In respect of the methods disclosed, the steps presented are exemplary in nature, and thus, the order of the steps is not necessary or critical.

FIGS. 1-4 illustrate a convertible wreath 10 according to an embodiment of the present disclosure. As shown, the wreath 10 includes a base 12 having a plurality of permanent decorations 14 coupled thereto and a plurality of removable decorations 16 releasably coupled thereto.

The base 12 can have any size and shape, and can be made from any natural or artificial materials such as: straw, twigs, evergreen branches, grape-vine, wood, or plastic. Typically, the base 12 is substantially annular and can fit on a door or hang on a wall. Included on the base 12 are a pre-determined number of attachment points 18. The attachment points 18 can have any size and shape. The number of attachment points 18 may be based upon an overall size of the wreath 10, or other characteristics of the wreath 10. The attachment points 18 are typically disposed on an unobstructed area 20 of the base 12 (i.e. an area not covered by the permanent decorations 14). Typically, the unobstructed area 20 and attachment points 18 are planar to be easily accessible and in some embodiments ensure complete surface adhesion between the attachment points 18 and the removable decorations 16, although other surface configurations can be used. The attachment points 18 can be randomly or uniformly arranged on the base 12, as desired. Each of the attachment points 18 may include a coupling device 22 disposed thereon for selectively coupling the removable decorations 16 to the base 12. In certain embodiments, the attachment points 18 protrude from a surface of the base 12. However, the attachment points 18 may be flush with, or indented below, the surface of the base 12.

Figure 2:
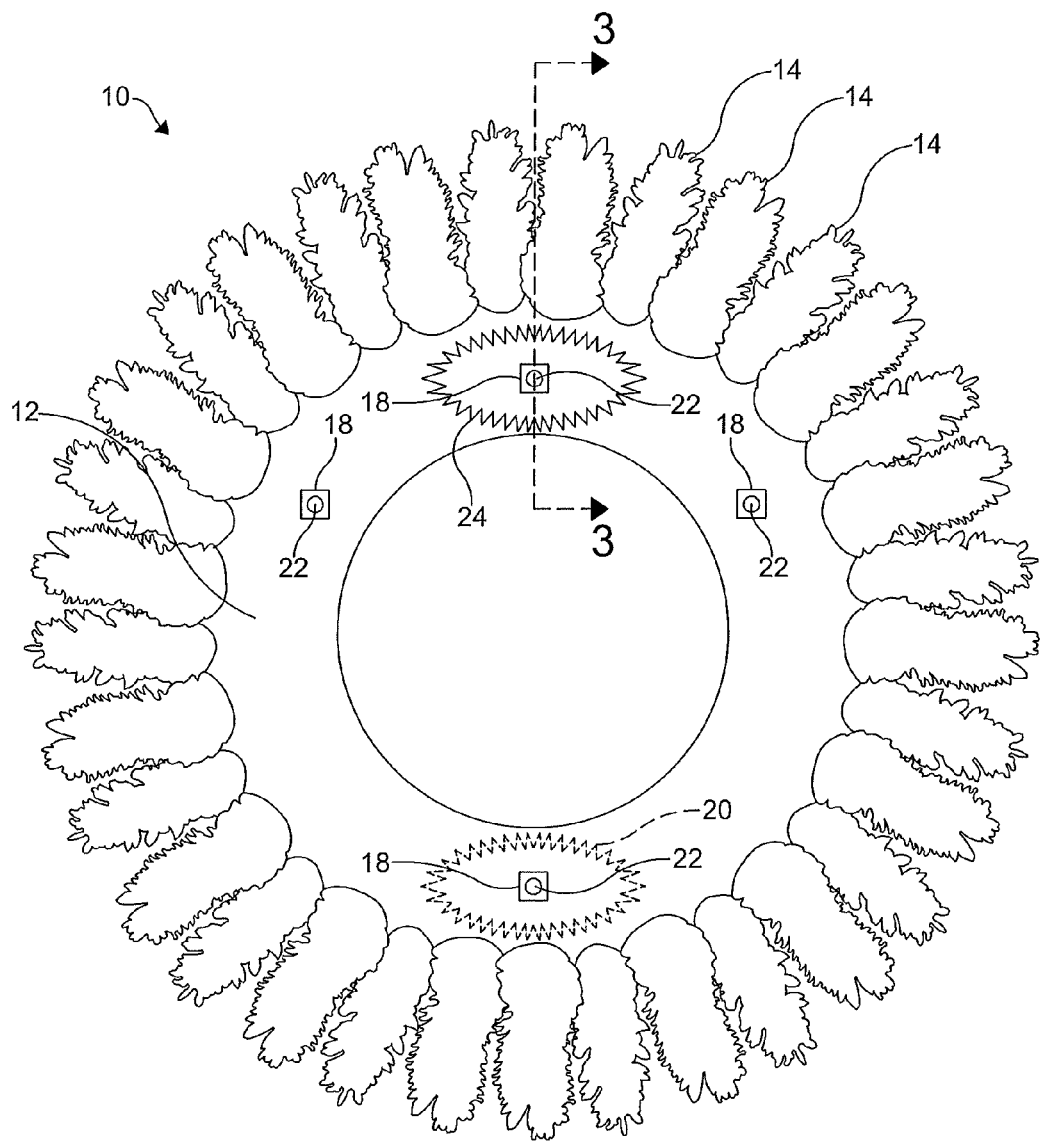
FIG. 2 is a schematic representation of the convertible wreath of FIG. 1.
Figure 3:
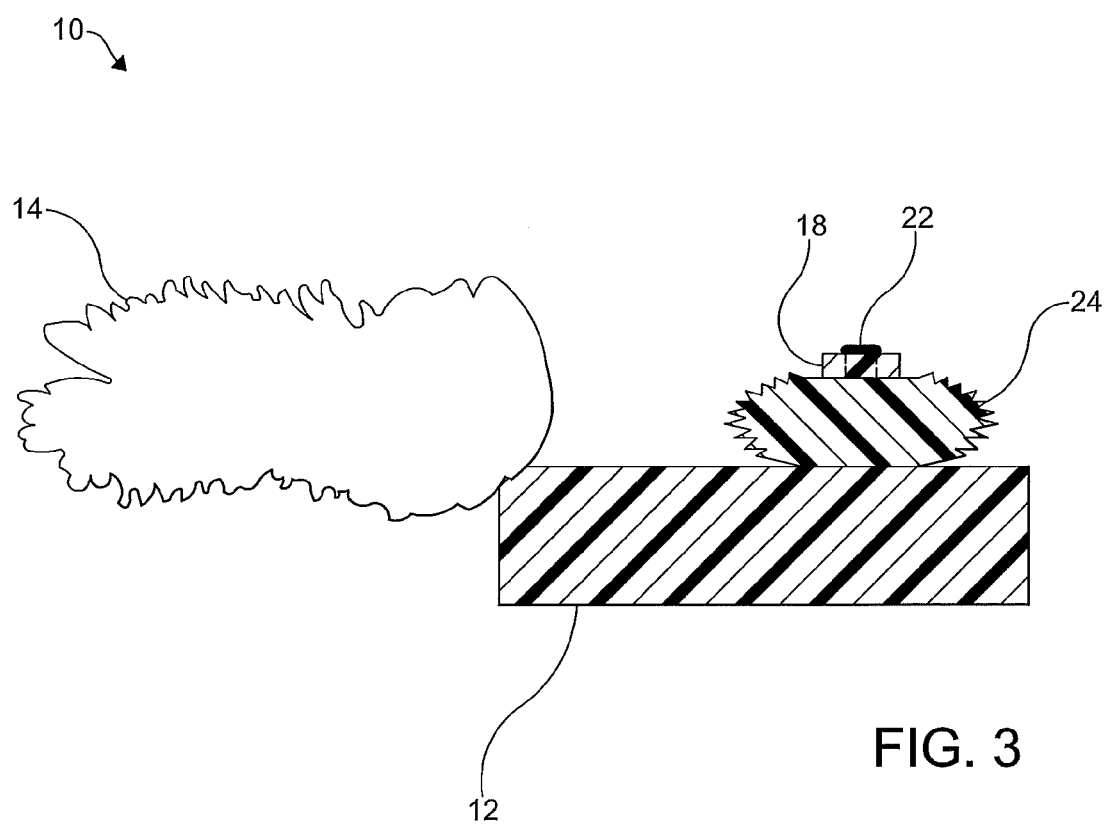
FIG. 3 is schematic cross sectional view of the convertible wreath taken along line 3-3 of FIG. 2.

As a non-limiting example, FIGS. 2-3 more clearly illustrate one embodiment of the attachment points 18. A riser 24 extends laterally outwardly from the base 12 a pre-determined distance. The riser 24 is typically attached (permanently or releasably) to a portion of the base 12 and extends beyond a facial coverage of the permanent decorations 14 so that the attachment point 18 is not covered by the permanent decorations 14. It is understood that the riser 24 can be formed from a pine cone, a piece of wood, an artificial material, or any other material that can be aesthetically blended with the permanent decorations 14 and the removable decorations 16. The risers 24 may vary in height to accommodate various removable decorations 16, or they may be the same height. As a non-limiting example, the height of the riser 24 may be equal to the distance that the permanent decorations 14 extend laterally outwardly from the base 12.

The coupling devices 22 disposed on the attachment points 18 can be any means for removeably and selectively coupling the removable decorations 16 to the base 12. As a non-limiting example, the coupling devices 22 are formed from one of a hook and a loop type coupling system. As a further non-limiting example, the coupling devices 22 may be magnetic coupling elements. The coupling devices 22 should be strong enough to withstand continuous removal and replacement of the removable decorations 16, and the effects of gravity.

The permanent decorations 14 are typically formed from assorted natural and artificial objects such as: pine cones, acorns, nuts, shells, coral, pebbles, lava, tree bark, an artificial material, and other decorative and durable materials. It is understood that other materials may be used as the permanent decorations 14.

The removable decorations 16 are typically seasonal or occasional-use decorations such as items that are normally associated with holidays, celebratory events, and the various seasons. However, the removable decorations 16 can be non-seasonal and for everyday use. The removable decorations 16 can include decorative elements such as ribbons, berries, leaves, hearts, fruit, bells, flowers, words, phrases, photos, miniature replicas of larger items, and any other appropriate natural or artificial decorative elements. Typically, the removable decorations 16 are the same size as the unobstructed area 20 on which they are placed. However, the size of the removable decorations 16 may vary depending on the structure and size of the attachment area 18 and the riser 24 to which the removable decorations 16 are attached. It is understood that each of the removable decorations 16 may include a reciprocal coupling device 26 to mate with the coupling device 22 and secure the removable decorations 16 to the base 12. The coupling device 26 can be any means for removeably and selectively coupling the removable decorations 16 to the coupling device 22 of the base 12. As non-limiting examples, the coupling device 26 may be formed from one of a hook and a loop type coupling system, or include magnetic coupling elements.

Figure 4:
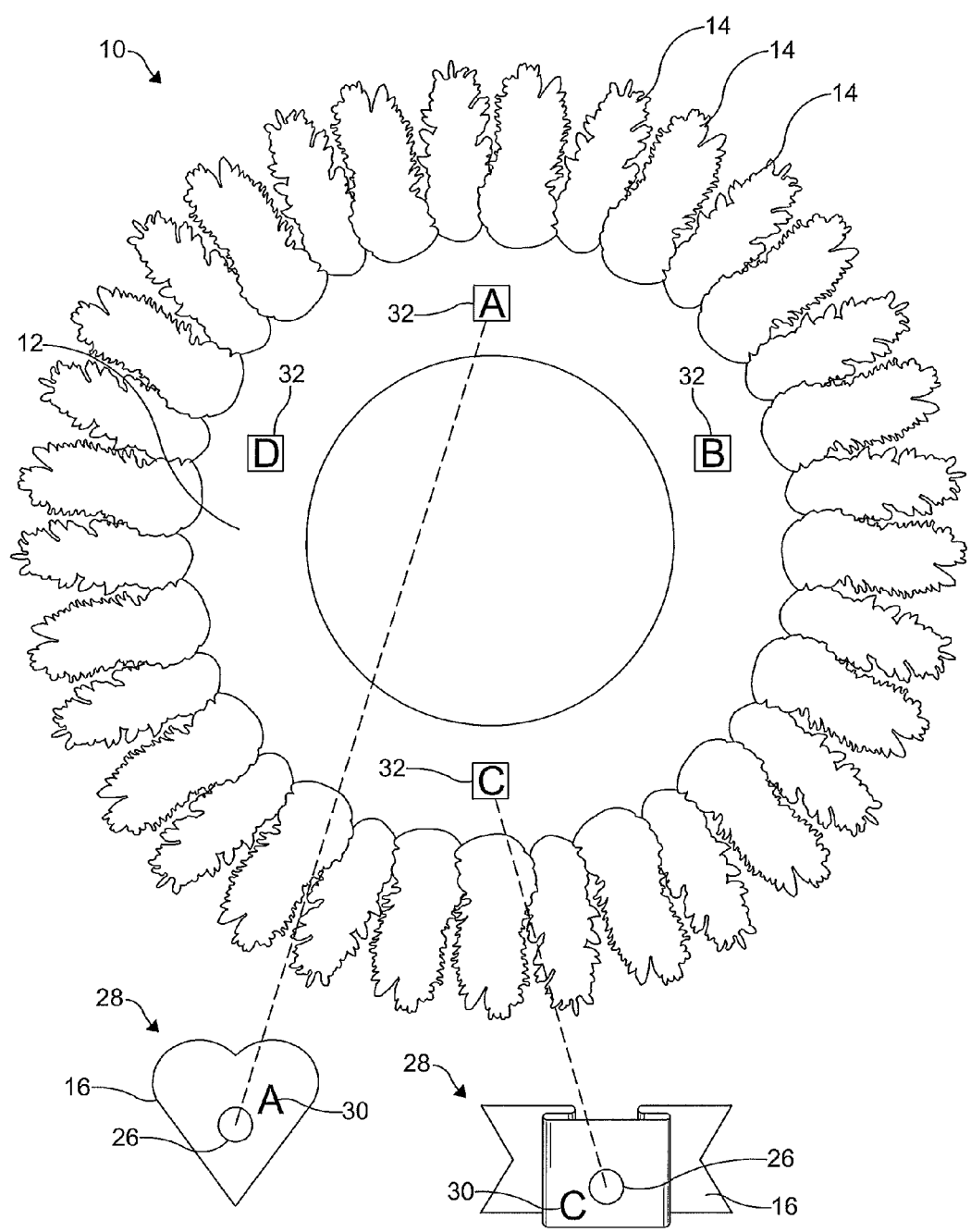
FIG. 4 is a schematic representation of a decoration kit for the convertible wreath of FIG. 1.

As more clearly shown in FIG. 4, the removable decorations 16 may be packaged as a decoration kit 28, wherein the removable decorations 16 are arranged based on a pre-determined set of decorating instructions (not shown). As such, any number of the decoration kits 28 can be packaged for any theme such as Christmas, Hanukkah, New Year, Valentine's day, St. Patrick's Day, Easter, Memorial Day, Independence Day, various seasons, weddings, anniversaries, birthdays, sports team colors, and the like, for example. As shown, each of the removable decorations 16 included in the decoration kit 28 can have a distinct arrangement label 30 such as a number, color, or letter corresponding to a particular label 32 on one of the attachment points 18 of the base 12. Each of the removable decorations 16 may also have a distinct coupling device 26 corresponding with a specific coupling device 22 on the attachment area 18. In this way, a user need only follow the instructions to place the removable decorations 16 in a pre-determined arrangement or match the appropriate coupling devices 22, 26. Accordingly, the pre-defined attachment points 18 and the decoration kit 28 labels 30, 32 minimize the need for artistic ability and simplify the arrangement of the removable decorations 16. Various decoration kits 28 having additional removable decorations 16 and instructions can be used by the user to change the appearance of the wreath 10.

Figure 5:
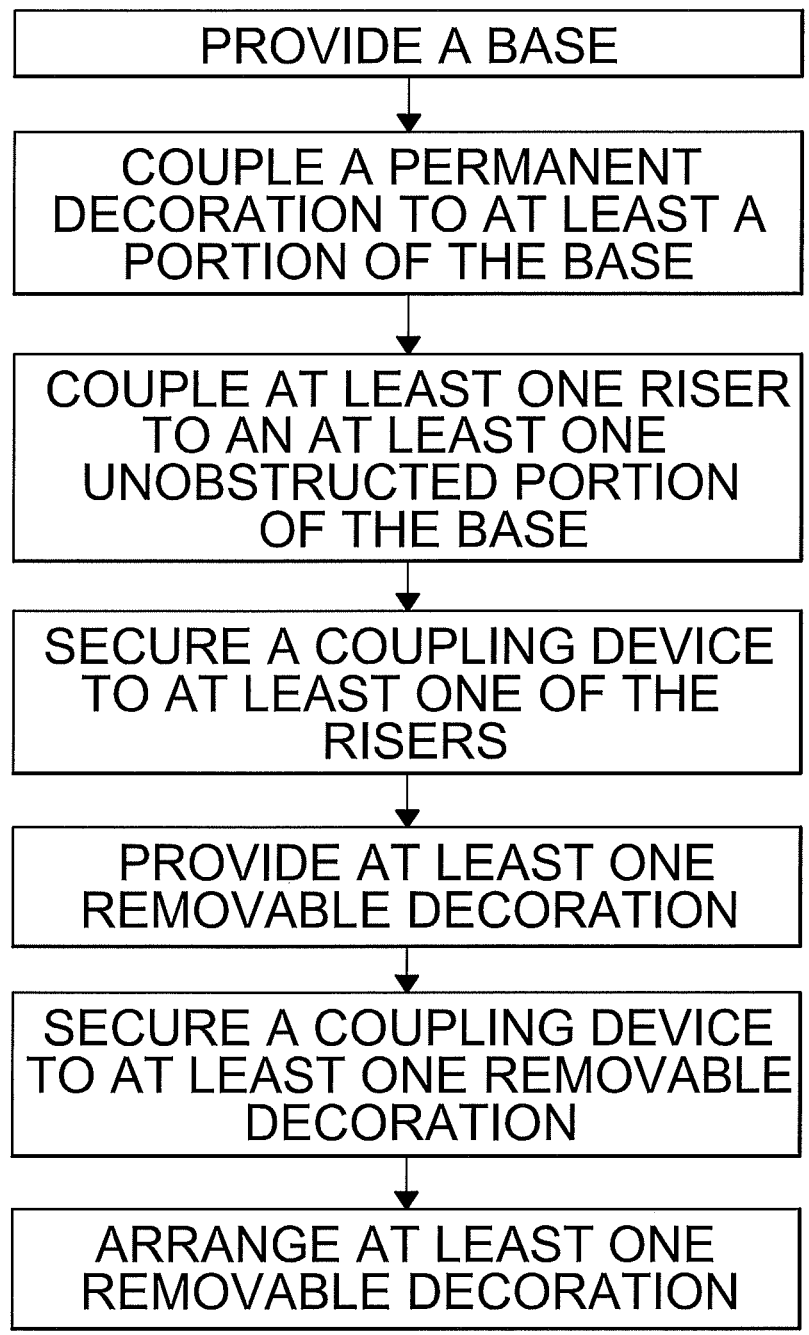
FIG. 5 is a schematic flow diagram of a method for arranging a wreath according to an embodiment of the present disclosure.

FIG. 5 illustrates a method 100 for decorating the wreath 10. In step 102, the base 12 is provided in a particular size and shape. In step 104, the base 12 is covered with the permanent decorations 14. Select areas (i.e. unobstructed areas 20) of the base 12 are not covered with the permanent decorations 14 and remain unobstructed. As a non-limiting example, the unobstructed areas 20 are approximately 2½"× 2". However, any size can be used. As a further non-limiting example, a wire may be wrapped around the base 12 with a loop formed in the wire to hang the wreath 10.

In step 106, the risers 24 (e.g. formed from a pine cone, piece of wood, or other object) are coupled to each of the unobstructed areas 20 of the base 12. Any number of the risers 24 can be used, including zero. Each riser 24 provides a means for the removable decorations 16 to be disposed within the permanent decorations 14. After the risers 24 are in place, any uncovered portions of the base 12 that are outside of the unobstructed areas 20 can be covered and decorated with additional permanent decorations 14. As a non-limiting example, the wreath 10 is sprayed with polyurethane which provides a seal and lasting shine. Also, additional artificial or natural accents such as leaves, flowers or colored berries, etc., are added as desired to complete the permanent decorations 14 around the wreath 10.

In step 108, at least one of the coupling devices 22 is secured to each of the risers 24 at the attachment points 18 to provide a means to selectively and releasably couple the removable decorations 16 to the wreath 10. It is understood that the coupling devices 22 can be secured directly to the base 12.

In step 110, the removable decorations 16 are provided in a size and shape that substantially correspond with the size and shape of the unobstructed areas 20. As a non-limiting example, one method for producing removable decorations 16 having a size and shape that substantially corresponds to the size and shape of the unobstructed areas 20 includes providing a template (not shown), using the template to outline the dimensions of the unobstructed areas 20 on the base 12, and forming the removable decorations 16 to substantially conform to the size of the template prior to removeably attaching the removable decorations to the base 12.

In step 112, at least one of the coupling devices 26 is secured to each of the removable decorations 16. The removable decorations 16 are pre-arranged into various decoration kits 28 based upon a particular aesthetic theme. It is understood that the user can decorate the wreath 10 using any decoration kit 28 or combination of individual removable decorations 16.

In step 114, the removable decorations 16 are arranged on the base 12 in accordance with the instructions. In a non-limiting example, the removable decorations 16 included in the decoration kit 28 have a distinct arrangement label 30 that corresponds with an identical arrangement label 32 on the attachment points 18 of the base 12. The arrangement label 30 may be located on the riser 24, the coupling device 22, the base 12, or any other appropriate area. The user is not required to follow the instructions and may use their own personal artistic ability to construct the wreath 10, if he or she so desires. It is understood that the permanent decorations 14 typically remain secured to the base 12 while the removable decorations 16 are selectively removed and replaced to change the aesthetic appearance of the wreath 10.

The wreath 10 and the method 100 of decorating the wreath 10 maximize an aesthetic and artistic appeal independent of an artist ability of a user. Each of the themes of the wreath 10 is unique. The user is able to choose a desired concept or theme for the wreath 10, such as a seashell wreath, rock wreath, assorted nut wreath, etc. The decoration kits 28 may be sold separately and can include a pre-determined number of removable decorations 16 based upon the size of the base 12, or other characteristics of the wreath 10.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A wreath comprising:
   a substantially annular base having an innermost perimeter and an outermost perimeter, the innermost perimeter defining a central hole of the base, the base having at least one permanent decoration coupled to the base at a permanent connection area of the base to cover an entirety of the outermost perimeter of the base, wherein the at least one permanent decoration is glued in place and is not releasably coupled to the base, the base further having a predetermined, unobstructed area disposed between the innermost perimeter and the outermost perimeter of the base, wherein an entirety of the unobstructed area is not covered by the at least one permanent decoration; and
   at least one removable decoration releasably coupled to the predetermined, unobstructed area of the base at an attachment area disposed in the unobstructed area,
   wherein the attachment area is at an end of a riser that extends to a location disposed laterally outwardly from the base a predetermined distance, the riser permanently attached to the base and the end being a portion of the riser that is laterally farthest from the base, the location disposed beyond a facial coverage of the permanent decorations so that the attachment area is not covered by the permanent decoration,
   wherein the base further includes a first coupling device disposed at the attachment area, and the removable decoration includes a second coupling device to releasably couple the removable decoration to the base at the attachment area with the first coupling device, and
   wherein the first coupling device and the second coupling device include one of a hook and loop coupling system and a magnetic coupling system.

2. The wreath of claim 1, wherein the base is formed from at least one of straw, twigs, evergreen branches, grape-vine, wood, and plastic.

3. The wreath of claim 1, wherein the at least one permanent decoration includes at least one of a pine cone, acorns, nuts, a shell, coral, pebbles, lava, and tree bark.

4. The wreath of claim 1, wherein the at least one removable decoration includes at least one of a ribbon, berry, leaf, fruit, bell, and flower.

5. The wreath of claim 1, wherein the base includes a first base label, and the at least one removable decoration includes a first decoration label corresponding to the first base label, the first base label identifying a location for releasably coupling the at least one removable decoration having the first decoration label to the base.

6. The wreath of claim 5, wherein the first base label and the first decoration label display matching indicia.

7. A decoration kit for a wreath, the decoration kit comprising:
   a substantially annular base having an innermost perimeter and an outermost perimeter, the innermost perimeter defining a central hole of the base, the base having at least one permanent decoration coupled to the base at a permanent connection area of the base to cover an entirety of the outermost perimeter of the base, wherein the at least one permanent decoration is glued in place and is not releasably coupled to the base, the base further having a predetermined, unobstructed area disposed between the innermost perimeter and the outermost perimeter of the base, wherein an entirety of the unobstructed area is not covered by the at least one permanent decoration; and
   a plurality of removable decorations for releasably coupling to the unobstructed area of the base at an attachment area disposed in the unobstructed area,
   wherein the attachment area is at an end of a riser that extends to a location disposed laterally outwardly from the base a predetermined distance, the riser permanently attached to the base and the end being a portion of the riser that is laterally farthest from the base, the location disposed beyond a facial coverage of the permanent decorations so that the attachment area is not covered by the permanent decoration, wherein the base further includes a first coupling device disposed at the attachment area, and each of the removable decorations includes a second coupling device to releasably couple each of the removable decorations to the base at the attachment area with the first coupling device, and wherein the first coupling device and the second coupling device include one of a hook and loop coupling system and a magnetic coupling system.

8. A method for providing a wreath, the method comprising the steps of:

providing a substantially annular base having an innermost perimeter and an outermost perimeter, the innermost perimeter defining a central hole of the base, the base having a permanent decoration coupled to the base at a permanent connection area of the base, wherein the permanent decoration covers at an entirety of the outermost perimeter of the base, and the permanent decoration is glued in place and is not releasably coupled to the base, wherein an entirety of the unobstructed area is not covered by the at least one permanent decoration, the base further having a predetermined, unobstructed area disposed between the innermost perimeter and the outermost perimeter of the base;

providing a removable decoration for releasably coupling to the unobstructed area of the base at an attachment area disposed in the unobstructed area, wherein the attachment area is at an end of a riser that extends to a location disposed laterally outwardly from the base a predetermined distance, the riser permanently attached to the base and the end being a portion of the riser that is laterally farthest from the base, the location disposed beyond a facial coverage of the permanent decorations so that the attachment area is not covered by the permanent decoration, wherein the base further includes a first coupling device disposed at the attachment area, and the removable decoration includes a second coupling device to releasably couple the removable decoration to the base at the attachment area with the first coupling device, and wherein the first coupling device and the second coupling device include one of a hook and loop coupling system and a magnetic coupling system; and releasably coupling the removable decoration to the unobstructed area of the base at the attachment area disposed in the unobstructed area.

9. The method of claim 8, wherein the base includes at least one base label corresponding to a label associated with the removable decoration.

10. The method of claim 9, wherein the at least one base label and the label associated with the removable decoration display matching indicia.

\* \* \* \* \*